(12) United States Patent
Batardière (10) Patent No.: US 11,570,087 B2
(45) Date of Patent: Jan. 31, 2023

(54) DATA ROUTING IN A CUSTOMER-PREMISES EQUIPMENT USING LINK AGGREGATION

(71) Applicant: SAGEMCOM BROADBAND SAS, Rueil Malmaison (FR)

(72) Inventor: Simon Batardière, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 59 days.

(21) Appl. No.: 16/756,716

(22) PCT Filed: Oct. 12, 2018

(86) PCT No.: PCT/EP2018/077942
§ 371 (c)(1),
(2) Date: Apr. 16, 2020

(87) PCT Pub. No.: WO2019/076770
PCT Pub. Date: Apr. 25, 2019

(65) Prior Publication Data
US 2020/0267076 A1    Aug. 20, 2020

(30) Foreign Application Priority Data
Oct. 17, 2017 (FR) ...................................... 1759750

(51) Int. Cl.
*H04L 45/24* (2022.01)
*H04L 45/74* (2022.01)
(Continued)

(52) U.S. Cl.
CPC ............ *H04L 45/245* (2013.01); *H04L 45/74* (2013.01); *H04L 61/5007* (2022.05); *H04L 69/16* (2013.01); *H04W 84/12* (2013.01)

(58) Field of Classification Search
CPC . H04L 12/2863; H04L 12/2865; H04L 45/24; H04L 45/245; H04L 45/74;
(Continued)

(56) References Cited

U.S. PATENT DOCUMENTS 9,729,431 B1 * 8/2017 Orr ........................ H04L 45/24
2007/0248009 A1 * 10/2007 Petersen ................ H04L 12/66
370/230

(Continued)

FOREIGN PATENT DOCUMENTS

WO    WO 2007/116411 A1    10/2007

OTHER PUBLICATIONS

Ford et al., "TCP Extensions for Multipath Operation with Multiple Addresses", IETF, RFC6824, Jan. 2013. (Year: 2013).*
(Continued)

*Primary Examiner* — Saad A. Waqas
(74) *Attorney, Agent, or Firm* — Pillsbury Winthrop Shaw Pittman LLP (57) ABSTRACT

The routing of data received from a first network device into a second network device, each having a link aggregation engine, includes detecting whether or not the data has already undergone a link aggregation operation in the first device or upstream, based on markers present in the data, and then selecting an output link from all the output links of the second device participating in link aggregation if the data has not already undergone link aggregation, or selecting the output link from all the output links of the second device participating in link aggregation except for the output link towards the first device if the data has already undergone link aggregation, and transmitting the data on the output link selected.

13 Claims, 5 Drawing Sheets

(51) Int. Cl.
*H04L 69/16* (2022.01)
*H04L 61/5007* (2022.01)
*H04W 84/12* (2009.01)

(58) Field of Classification Search
CPC .... H04L 61/2007; H04L 69/16; H04W 84/12; Y02D 30/50
See application file for complete search history.

(56) References Cited

U.S. PATENT DOCUMENTS

| | | | |
|---|---|---|---|
| 2011/0066875 A1* | 3/2011 | Fan | H04L 41/0668 714/4.11 |
| 2017/0063668 A1 | 3/2017 | Sivasankar et al. | |
| 2017/0230280 A1 | 8/2017 | Prunet et al. | |
| 2017/0302547 A1* | 10/2017 | Wang | H04L 43/0823 |
| 2018/0191638 A1* | 7/2018 | Saavedra | H04L 45/50 |
| 2019/0082373 A1* | 3/2019 | Patil | H04W 40/04 |
| 2019/0132322 A1* | 5/2019 | Song | H04L 63/0236 |
| 2019/0245868 A1* | 8/2019 | Patil | H04L 69/14 |
| 2019/0273809 A1* | 9/2019 | Boucadair | H04L 67/14 |
| 2020/0169918 A1* | 5/2020 | Hwang | H04L 45/245 |
| 2020/0304604 A1* | 9/2020 | Zhao | H04W 28/06 |

OTHER PUBLICATIONS

International Search Report as issued in International Patent Application No. PCT/EP2018/077942, dated Nov. 2, 2018.

* cited by examiner

DATA ROUTING IN A CUSTOMER-PREMISES EQUIPMENT USING LINK AGGREGATION

CROSS-REFERENCE TO RELATED APPLICATIONS

This is the U.S. National Stage of PCT/EP2018/077942, filed Oct. 12, 2018, which in turn claims priority to French Application No. 1759750, filed Oct. 17, 2017, the entire contents of all applications are incorporated herein by reference in their entireties.

TECHNICAL FIELD

The present invention generally relates to data routing in a residential gateway implementing link aggregation, for establishing a single multipath connection between two computing devices or computer network equipments.

It relates more particularly to a method for routing data, and a device and a related computer program product, for use in a residential gateway by implementing link aggregation.

In particular, the invention finds applications in residential gateways which connect home computer networks to the Internet.

TECHNOLOGICAL BACKGROUND

Link aggregation (also called "Bonding") is a technique used in computer networks such as Ethernet networks, for routing IPv4 ("Internet Protocol version 4") or IPv6 ("Internet Protocol version 6") packets, for example. It can be defined as the aggregation of several network interfaces into a logical interface so as to increase bandwidth and bring redundancy for a connection between two determined equipments. For example, it can be used to increase the throughput of a TCP ("Transmission Control Protocol") connection in a wide area network or WAN ("Wide Area Network", as opposed to the local area network or LAN).

In IP ("Internet Protocol") networks, it is most often set up between the ports of Ethernet switches in the Internet network, or between Ethernet cards of Linux, Unix or Windows computers. In this context, it enables several network ports to be gathered and used as a single one. It addresses two problems in networks, namely bandwidth limitation between two equipments, on the one hand, and the absence of link redundancy, on the other hand. Link aggregation indeed enables the throughput to be increased beyond limits of a single link, and possibly it ensures that the other ports take over if a link fails. However, aggregation is a general concept which can be implemented in each of the three lower layers of the OSI ("Open Systems Interconnection") model.

Within the context of the present invention, aggregation of different links enables the throughput of a "residential gateway" to be increased by simultaneously using the capabilities of a plurality of DSL ("Digital Subscriber Line") links, respectively associated with a plurality of residential gateways and via which each residential gateway can communicate with the Internet. Aggregation uses other links established between the residential gateways. Typically, DSL links to the Internet are established through an Ethernet interface of the residential gateway, and a link with another residential gateway is for example established through a Wi-Fi interface (IEEE 802.11 or ISO/CEI 8802-11 standards), although these examples are not exclusive.

By "residential gateway" or CPE ("Customer-Premises Equipment"), it is meant a terminal hardware equipment which is located at the premises of a customer (individual or company), and which is connected on the one hand to an LAN local loop and on the other hand to the infrastructure of an Internet access provider (IAP) in a point of presence or POP. It is the customer side terminal device which is used to connect to the Internet network. This equipment is also commonly called a "set top box".

PRIOR ART

Aggregation of different links is per se a technique already known and deployed. Numerous technologies enable its implementation, such as for example all the plug-ins of the TCP specification known as "Multipath TCP" or MPTCP, or Generic Routing Encapsulation or GRE. The basic idea underlying link aggregation such as it is implemented, for example, in the MPTCP protocol defined in RFC 6824 of IETF, is to establish a link between a source host and a destination host and no longer between two interfaces as is the case in the standard Transmission Control Protocol (TCP).

MPTCP is an ongoing effort of the IETF ("Internet Engineering Task Force") the aim of which is to enable TCP to use several access paths in order to maximise use of resources and redundancy increase while remaining compatible with current Internet equipments (firewall, NAT, . . . ). A customer can rely on this protocol to connect to a same destination host via several connections on different network adaptors, thus creating reliable efficient data connections between the source host and destination host which interact with existing network infrastructures. MPTCP thus enables one and the same TCP connection to be established and use through several network interfaces. The typical case of use consists in unloading 4G networks (or LTE, for "Long Term Evolution", namely the worldwide standard of fourth generation wireless services) via Wi-Fi, which makes it possible to use a public Wi-Fi access point (or "hot spot") when the terminal is within radio range of this access point, and to seamlessly switch back to the 4G network exclusively as soon as the terminal is no longer within range. Another application is the seamless sharing of several links (for example, two Ethernet cables) for a server.

The interest of MPTCP is indeed to be totally seamless for applications. Unlike, the connection of Ethernet channels using link aggregation according to IEEE 802.3ad LACP ("Link Aggregation Control Protocol") protocol, for example, Multipath TCP can balance one and a single TCP connection through multiple interfaces. An implementation both on the customer side and on the server side is sufficient to make it possible. In January 2013, IETF released multipath TCP specifications as a tentative standard in RFC 6824.

GRE is as for it is a tunneling protocol which enables any packet of the network layer to be encapsulated. The original packet is the payload of the final packet. For example, tunnel servers which cipher data can use GRE through Internet to secure virtual private networks. GRE protocol corresponds to code 47 in the "protocol" field in the IP header of an IPv4 packet, or the "next header" field of the last header of an IPv6 packet.

All these technologies require an aggregation point deployed in the core network, in order to restore in the network the data stream from substreams respectively received by each of the aggregated links.

A new application of the link aggregation concept, being still currently investigated, would consist in using the public Wi-Fi hot spot of another CPE of the same access provider being within radio range to add an additional WAN link eligible for aggregation into a determined CPE. In order to increase its throughput, this CPE could thereby switch its Wi-Fi into a station mode, to connect to the public Wi-Fi of the other CPE within range, and thus take advantage of the bandwidth of the latter. And this, while still broadcasting itself its own access point for the public Wi-Fi.

However, there might be a problem which is the creation of a loop if both CPEs implement this technology.

For example, in order to take advantage of the link aggregation, a first CPE sends a packet to a second CPE via the public Wi-Fi. The second CPE is supposed to route it to the WAN. However, if it also implements link aggregation techniques, and by applying the link selecting algorithm among the available ones it executes, it can choose the public Wi-Fi going to the first CPE. In which case, the first CPE receives its own packet. A loop has thus been created, which has two drawbacks. Firstly, the loop can continue a number X of times, depending on the link selecting algorithms executed in each of the CPEs, which introduces latency or even packet losses, as well as useless Wi-Fi load. Secondly, nowadays technologies MPTCP, GRE add a header to each packet to perform bonding, resulting in decreasing MTU ("Maximum Transmission Unit") and in causing IP fragmentation. Adding useless encapsulations amplifies this problem.

There are different protocols which prevent the formation of loops in a network, such as STP ("Spanning Tree Protocol") and layer-2 LACP ("Link Aggregation Control Protocol"), or OSPF ("Open Shrotest Path First"), IS-IS ("Intermediate System to Intermediate System"), BGP ("Border Gateway Protocol"), EIGRP ("Enhanced Interior Gateway Routing Protocol"), DSDV ("Destination Sequence Distance Vector") and layer-3 Babel. Moreover, there are also techniques which prevent loops in a network. For example, a bridge will never forward a packet on the interface through which it received it. However, these protocols and these techniques do not deal with the loopback problem as part a hybridation route selection.

SUMMARY OF THE INVENTION

The invention makes it possible to solve a problem raised by link aggregation or "bonding", which is the creation of a loop if both customer and destination CPEs, implement this technology.

The invention aims at eliminating, or at least mitigating, all or part of the abovementioned drawbacks of prior art.

To do so, a first aspect of the invention provides a method for routing data received from a first network equipment into a second network equipment, each of said first and second network equipments comprising a link aggregation engine implementing a link aggregation technique by using the same aggregation rules to select one from at least a first and a second output links involved in the link aggregation in said network equipment with:
- an output link to the other network equipment; and
- at least one other output link which is capable of reaching an aggregation point in the network, the method comprising the following steps, implemented in the second network equipment, of:
 i. receiving data arriving from the first network equipment;
 ii. detecting whether or not data have already undergone a link aggregation operation in or upstream of the first network equipment, based on markers present in the data; and then,
 iii. selecting an output link from all the output links of the second network equipment involved in the link aggregation in said second network equipment if the data have not already undergone a link aggregation, or selecting the output link from all the output links of the second network equipment involved in the link aggregation in said second network equipment except for the output link to the first network equipment if the data have already undergone a link aggregation; and,
 iv. transmitting data over the selected output link.

Advantageously, the method according to the invention enables the abovementioned problems of prior art to be overcome.

Embodiments comprise using an aggregation engine of the second network equipment to select the output link of said second network equipment if the second network equipment comprises more than one output link other than the output link to the first network equipment.

In some implementations, it can also be provided that, if the second network equipment comprises only a single output link other than the output link to the first network equipment, then the step of transmitting data comprises transmitting data directly over said single output link other than the output link to the first network equipment, without using the aggregation engine of the second network equipment.

When the first network equipment and the second network equipment use the MPTCP protocol for link aggregation, detecting whether or not data have already undergone a link aggregation operation in or upstream of the first network equipment can for example comprise testing the presence of the "multipath TCP" TCP 30 option in the data received in the second network equipment.

Alternatively, when the first network equipment and the second network equipment use GRE tunnels for link aggregation, detecting whether or not data have already undergone a link aggregation operation in or upstream of the first network equipment comprises testing whether the "protocol" field in the IP header of an IPv4 data packet, or the "next header" field in the last header of an IPv6 data packet, included in the data received from the first network equipment, is equal to 47.

In the case of both embodiments above, detecting whether or not data have already undergone a link aggregation operation in or upstream of the first network equipment can further comprise, checking the interface through which data entered the second network equipment to remove limitations related to the fact that MPTCP or GRE, respectively, can have been used in or upstream of the first network equipment in another context than the link aggregation.

In other embodiments, detecting whether or not data have already undergone a link aggregation operation in or upstream of the first network equipment can comprise comparing the destination IP address of a data packet comprised in the data received from the first network equipment with IP addresses contained in a list of respective IP addresses of a plurality of aggregation points of the data network.

Still in other examples, detecting whether or not the data have already undergone a link aggregation operation in or upstream of the first network equipment can comprise further testing an identifier, known by the second network equipment, of the first network equipment and/or of another device upstream of said first network equipment through which data have passed before reaching the second network equipment.

For example, the identifier of the first network equipment comprises a physical address in the network which is unique to said first network equipment, and is known to the second network equipment either statically or because it is communicated to said second network equipment by a management protocol of the network, and testing the identifier can then comprise comparing with an interval of physical addresses known to the second network equipment.

In other embodiments, in which data are received from the first network equipment via a Wi-Fi IEEE 802.11 interface of the second network equipment, detecting whether or not data have already undergone a link aggregation operation in or upstream of the first network equipment can comprise further testing a specific value in the attribute number 26 of a probe request type frame.

Finally, when the second network equipment acts as a DHCP server towards the first network equipment and data being received by said second network equipment via a public Wi-Fi network, detecting whether or not data have already undergone a link aggregation operation in the first network equipment can comprise testing a DHCP option with a predefined value known to the first network equipment and the second network equipment, which is inserted by the first network equipment when the data are subjected to a link aggregation in said first network equipment.

In a second aspect, the invention relates to a device for routing data received from a first network equipment into a second network equipment, each of said first and second network equipments comprising a link aggregation engine implementing a link aggregation technique by using the same aggregation rules to select one from at least a first and a second output links involved in the link aggregation in said network equipment with:
 an output link to the other network equipment; and
 at least one other output link which is capable of reaching an aggregation point in the network, the device comprising, in the second network equipment:
 i. means for receiving data coming from the first network equipment;
 ii. means for detecting whether or not the data have already undergone a link aggregation operation in or upstream of the first network equipment, based on markers present in the data; and then,
 iii. means for selecting an output link from all the output links of the second network equipment involved in the link aggregation in said second network equipment if the data have not already undergone a link aggregation, or selecting the output link from all the output links of the second network equipment involved in the link aggregation in said second network equipment except for the output link to the first network equipment if the data have already undergone a link aggregation; and,
 iv. means for transmitting data over the selected output link.

In a third aspect, another object of the invention is also a residential gateway comprising a device according to the second aspect.

In a fourth aspect, a further object of the invention is a "computer program" product directly loadable into the internal memory of a digital computer, comprising software code portions which, when said program is run by a computer, cause the same to implement all the steps of the method according to the first aspect hereinabove. More particularly, the computer program product comprises one or more instruction sequences stored on a machine readable memory medium comprising a processor, said instruction sequences being adapted to perform all the steps of the method according to the first aspect of the invention when the program is read in the memory medium and run by the processor.

A fifth aspect of the invention finally relates to a machine readable data recording medium comprising a processor (i.e., a computer), comprising the program according to the fourth aspect. Such a recording medium can be an optical recording medium such as a CDrom or a DVDrom, a magnetic recording medium such as a computer hard disc, an electrically readable electronic memory such as an EPROM, an EEPROM, a DRAM memory, a Flash memory, etc.

BRIEF DESCRIPTION OF THE DRAWINGS

Further characteristics and advantages of the invention will further appear upon reading the following description. The latter is purely illustrative and should be read in relation to the appended drawings in which.

DETAILED DESCRIPTION OF EMBODIMENTS

In the description of embodiments that will follow and in the figures of appended drawings, identical or similar elements have the same reference numerals.

As set forth in the introduction, different technologies use the concept of link aggregation between equipments of a network (for example switches or routers), or between an apparatus (for example a computer) and a network, especially in order to increase the throughput beyond limits which are reached with a single link. These existing techniques can be implemented in each of the three lower layers of the OSI model.

There is for example aggregation of physical Ethernet links via the "Channel Bonding" between two routers of a network, that the network layer of the OSI model only sees as a single communication logical channel. Another example is given by sharing several links (for example, two Ethernet cables) for seamlessly connecting a computer with a server. Over a wireless network, according to another example, an equipment can combine several frequency ranges into a single more extended one. Thus for example, in IEEE 802.11n, an operation mode with a frequency range extending over 40 MHz is defined. This single channel uses two adjacent bands of 20 MHz (i.e., two carriers). The term carrier aggregation is then also used. Still another example is the aggregation of a 4G link and of a Wi-Fi link within a mobile terminal (mobile phone or tablet, for example). Also, within a residential gateway (set top box), the aggregation of a DSL link such as an Ethernet link and a radio link as a 3G/4G link of the subscriber's mobile terminal to these two services is known.

Aggregating two DSL links of two residential gateways of two subscribers of a same Internet access provider via a Wi-Fi connection established between these two equipments when they are within radio range of each other, can be considered as a new extension of the above examples. A case of use contemplatable is when two such set top boxes respectively installed in two neighbour buildings, for example two houses, and each having an Ethernet link to connect to Internet network servers, are within radio range of each other so that they can communicate via Wi-Fi. The Ethernet link of one of the subscribers can then be aggregated with the one of his/her neighbour, via the Wi-Fi connection between both set top boxes.

However, in such a context, possibly extended to more than two residential gateways within range of each other, a risk of loop creation has been identified if no precautions are taken, as set forth in the introduction of the present description. Embodiments of the invention provide a solution for removing or at least significantly decreasing this risk.

By way of non-limiting example, the present description will be given below with reference to a network equipment which is a residential gateway (i.e., a set top box). Residential gateways play a significant role today by connecting home networks to the Internet. Set top boxes considered here, each have an interface for connection to the corresponding user's home network, namely a local area network (LAN). They also each have one or more several interfaces, among which at least one interface for communicating with another similar set top box, and at least one other interface for communicating with Internet or any other wide area network (WAN).

Each interface of the set top box is bidirectional: it has an input link and an output link. The terms "input" and "output" are here used in reference to the data exchange from the set top box point of view. In data uplink (to transfer data from LAN to WAN), the input link of the LAN interface and the output link of the WAN interface are used. For a downlink data transfer (from WAN to LAN), it is the reverse: the input link of the WAN interface and the output link of the LAN interface are used.

In a non-limiting example, at least one interface has at least one link (an input link or an output link, or both) which is "open", that is freely accessible for third parties. It is through the input and output links of this interface that the set top box can communicate with a similar set top box.

Particularly, it can be a link to a public network, for example a link to a wireless network.

Exemplary wireless networks are especially:
public or professional mobile telephone networks, such as GSM 3G/4G public network (LTE);
wireless local area networks (WLAN) such as Wi-Fi (802.11) or hiperLAN 2 ("High Performance Radio LAN 2.0"); or even,
wireless personal area networks noted as WPAN, also called wireless individual networks or wireless home networks, having a short range in the order of a few tens of metres, such as ZigBee (also known as IEEE 802.15.4) or Bluetooth (also known as IEEE 802.15.1); etc.

But it can also be a physical link (for example a wired link) freely accessible by third party devices, such as a PLC ("Powerline Communications" link over the electric power grid of a house, a building or even a district, or other (see for example IEEE 1901).

Also, the link between both set top boxes is not necessarily a link open to the public in every sense. It can be a Wi-Fi link established between two subscribers which decide to share their resources for accessing a network such as the Internet, for example two neighbours living in a same street or in the same district of a town or village, and who share access codes to do so. Also, the link between both network equipments, through Wi-Fi or the like, can be defined by default between two residential gateways provided by a same Internet access provider (IAP), who can regard this as a possibility to seamlessly extend the quality of service (QoS) for each subscriber.

Preferably, an input link and an output link at least are such "open" links. It is of course understood that the invention is however not limited to these examples and can be applied to any type of equipment with different interface combinations in a number greater than or equal to two, among which Ethernet, CPL, Wi-Fi, 3G/4G interfaces, etc. as long as they provide respective links to Internet likely to be aggregated via a link between two devices, to increase the throughput of each device (or of at least one of such devices) upon a connection to Internet or to another wide area network (WAN), for example.

Figure 1:
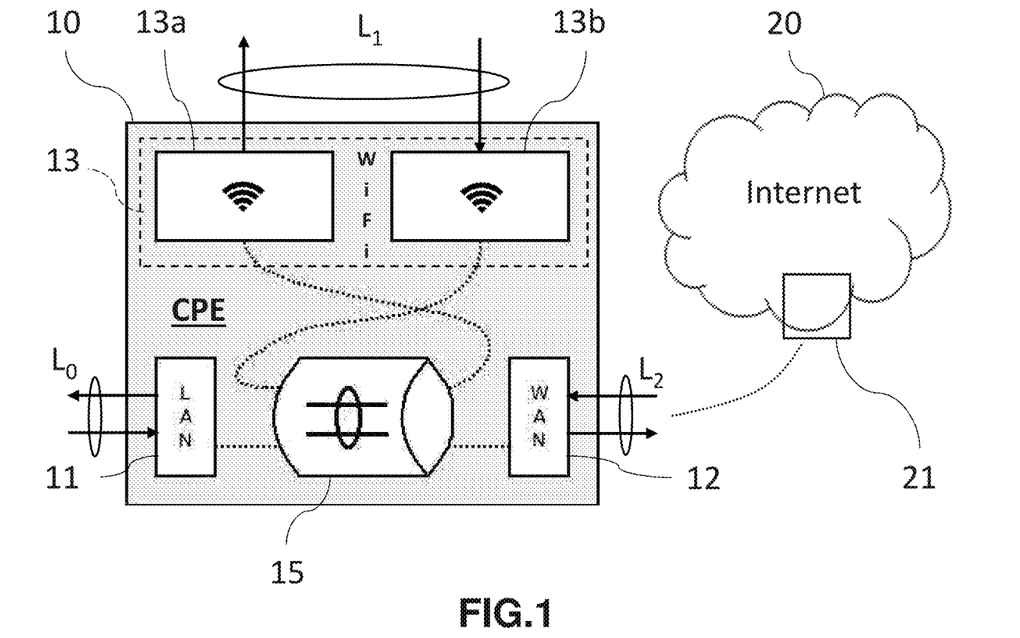
FIG. 1 is a block diagram showing an exemplary residential gateway implementing the aggregation of two links for a communication between a home network and the Internet, for example.

With reference to the schematic diagram of FIG. 1, such an exemplary residential gateway 10 (CPE) can comprise a first Ethernet interface 11 to communicate with a local area network (LAN) not represented, a second Ethernet interface 12 to communicate with a wide area network (WAN) such as the Internet 20, and a Wi-Fi interface 13 to wireless communicate with other similar devices. In implementations, these other devices supporting Wi-Fi are able to connect with the gateway 10 when they are within radio range.

Gateway 10 implements link aggregation to communicate with a host in network 20, via an aggregation point 21 somewhere in said network. More particularly, link aggregation is here implemented between the respective Ethernet links 12 of two identical or similar equipments by using the Wi-Fi link between these two equipments. More particularly, set top box 10 comprises an aggregation engine 15 receiving the It will be noted that the aggregation point is not systematically the same for all the pieces of equipment which are likely to be involved in the loop formation.

In the context of the implementation of the method for routing data according to embodiments of the invention, a gateway such as gateway 10 shown in FIG. 1 can thus communicate with a host in the network 10 directly via the Ethernet interface 12, but also indirectly via an Ethernet interface of another identical or similar network equipment with which it communicates via Wi-Fi.

Indeed, the advent of technologies such as Wi-Fi offer the Internet users the possibility of transforming their private access point into a public, or at least shared hotspot. Indeed, each Internaut can give other Internauts the possibility of using all or part of his/her bandwidth to communicate with Internet via his/her Wi-Fi network. The residential gateway of an individual can thus become a Wi-Fi hotspot open to all the users present in the radio coverage area. This possibility is presently promoted by some Internet access providers (IAP) within the community of their customers/subscribers. They see this as a means for increasing the available bandwidth for each of their subscribers by pooling the access points of several of them. Residential gateways require capabilities which inevitably grow with the increase in multimedia data traffic, the multiplication of cloud applications and the access throughput increase (sometimes above 100 Mbit/s). This increased complexity results in a larger occurrence of technical problems, which leads to a cost increase for service providers, in particular with on-site intervention.

In this context, the invention provides a solution to the problem consisting of the loop formation risk when links which are aggregated are links of two network equipments (CPE) which both implement link aggregation, with at least two links:
- an output link to the other network equipment such as the output link $L_1$ of the interface 13 (Wi-Fi interface) of the equipment 10 of FIG. 1; and
- at least one other output link such as the output link $L_2$ of the interface 12 (WAN interface) of the equipment 10 of FIG. 1, which is able to reach an aggregation point such as the aggregation point 21 of FIG. 1, in the network 20.

Figure 2A:
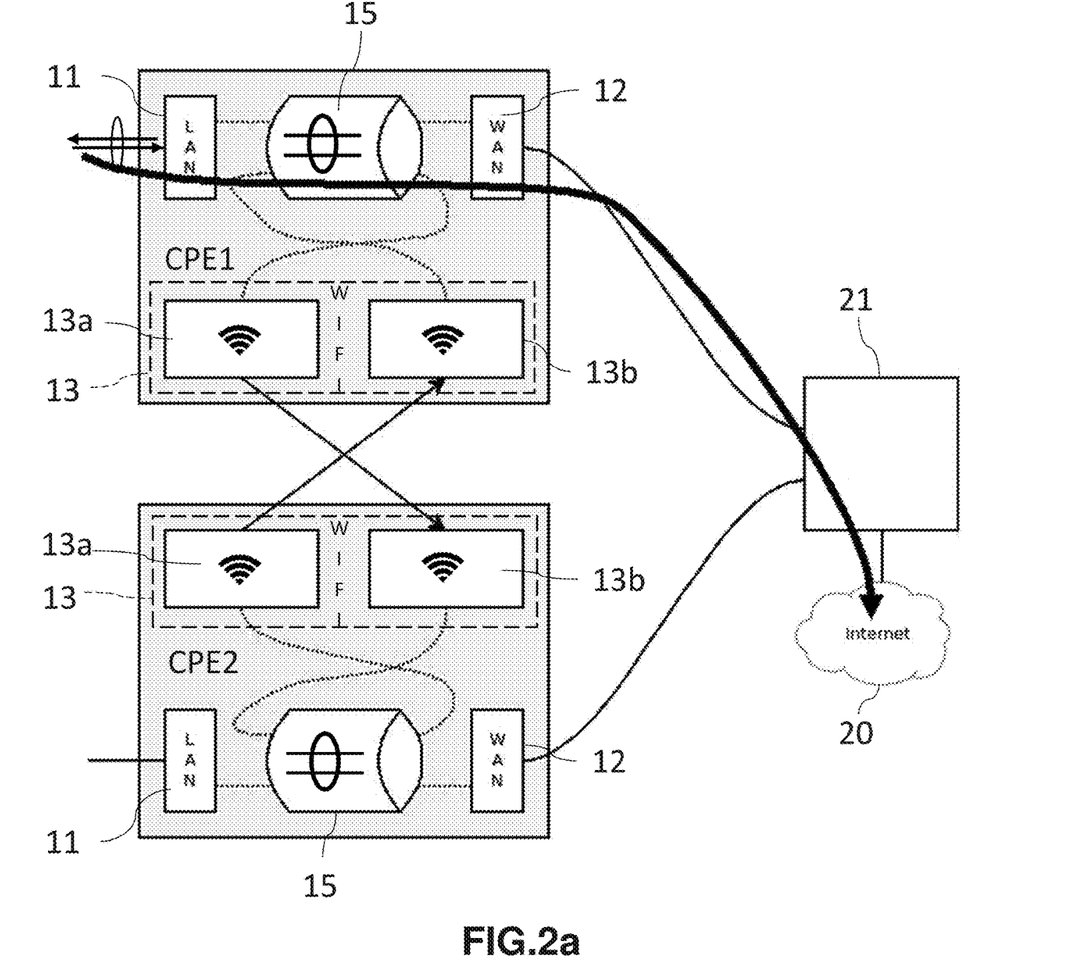
FIGS. 2A-2C illustrate different paths which data can follow between the residential gateway of FIG. 1 and the Internet when another residential gateway, also implementing link aggregation, can be reached by data within the scope of link aggregation.
Figure 2B:
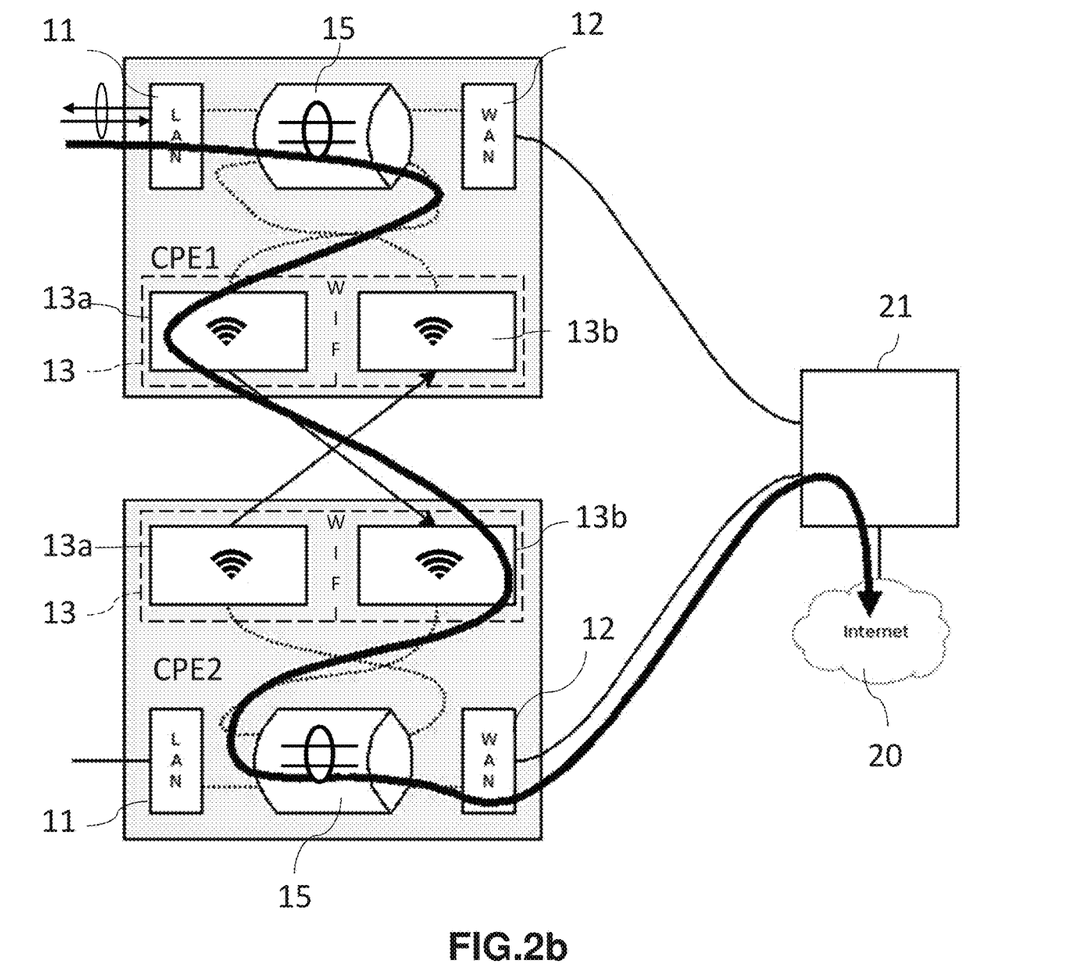
Figure 2C:
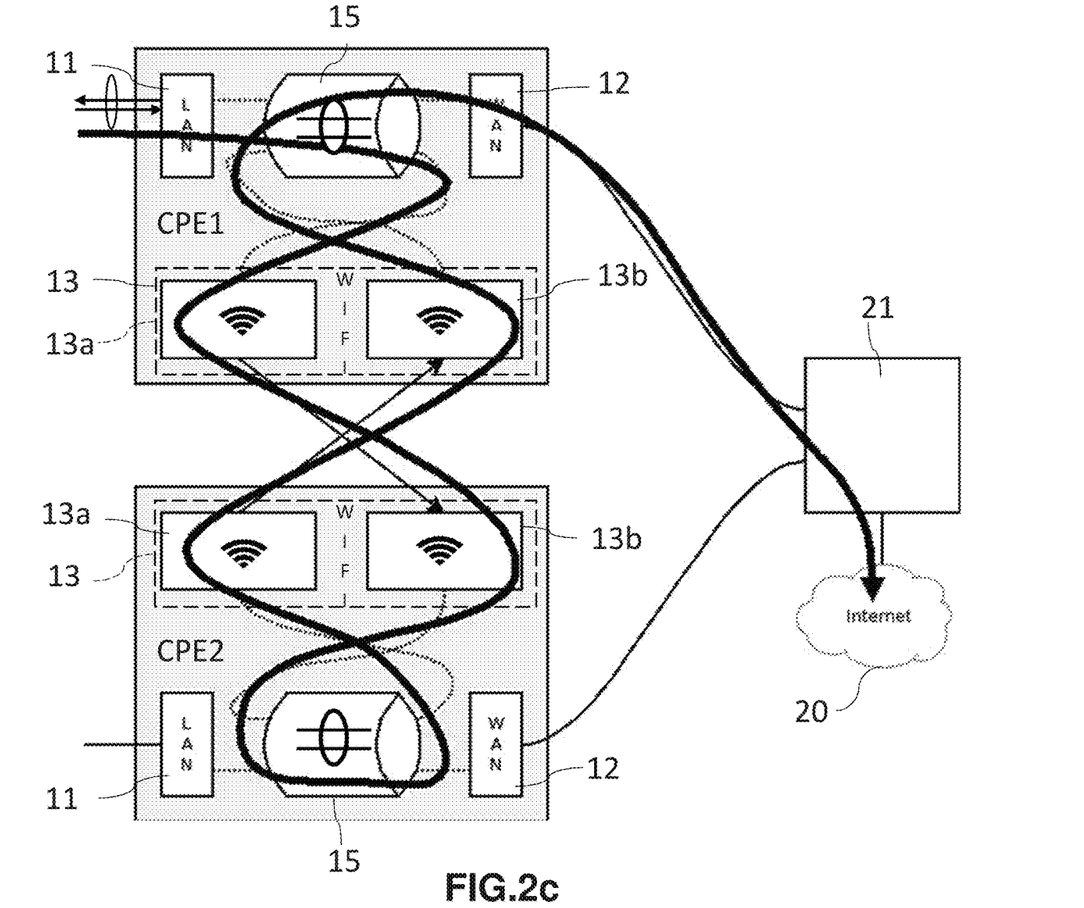

FIGS. 2A-2C illustrate different paths that data can follow between a first residential gateway CPE1 and a second residential gateway CPE2 as the one of FIG. 1 both implementing link aggregation, when each has a direct output link to the Internet, another output link to reach the Internet via the other gateway. For example, it can be the fact of being a public Wi-Fi customer of a residential gateway located in the neighbourhood.

It is this last link which can be the cause of loops, as it will now be set forth. Indeed, if the destination of an output link of a device implementing the link aggregation is a device which can also perform link aggregation with a direct link to the Internet and another link which only reaches the Internet indirectly through the source device, then this output link can be the cause of loop creation.

In FIGS. 2A-2C, the path taken by data to reach the aggregation point in the Internet is represented by a thick line.

With reference to the schematic diagram of FIG. 2A, the aggregation engine of gateway CPE1 can decide to use only the output link $L_2$, i.e. the output link of the WAN Ethernet interface to reach the aggregation point 21 in the Internet 20 directly. In such a case, there is no loop formation risk.

In the case of FIG. 2B, the aggregation engine of gateway CPE1 decides to use not only the output link $L_2$, i.e. the output link of the WAN Ethernet interface, but also the output link $L_1$, i.e. the link which will enable it to directly reach the aggregation point 21 in the Internet 20, namely via the Ethernet link of the other gateway CPE2. Stated differently, the output links $L_1$ and $L_1$ of gateway CPE1 are aggregated. In such a case, there is a loop formation risk. Actually, it all depends on the decision made this time by the aggregation engine of links of gateway CPE2. In the represented example, only the output link $L_2$, i.e. the output link of the WAN Ethernet interface, of gateway CPE2 is used to directly reach the aggregation point 21 in the Internet 20 from gateway CPE2. In such a case, there is no loop formation. Aggregation of output links $L_2$ of each of the residential gateways CPE1 and CPE2, respectively, goes well.

But on the other hand, in the case represented in FIG. 2C, a loop is formed. Indeed, in this example, the aggregation decision made by the aggregation engine of gateway CPE1 is the same as in the case set forth in FIG. 2B and described above. Nevertheless, the aggregation engine of gateway CPE2 in turn makes the decision to use this time not only the output link $L_2$, i.e. the output link of the WAN Ethernet interface, but also the output link $L_1$, i.e. the link which enables it to indirectly reach the aggregation point 21 in the Internet 20, namely via the Ethernet link of gateway CPE1. A loop is then formed, since the gateway CPE1 gets back data it sent to gateway CPE2. The drawbacks associated with this loop exist whatever the aggregation decisions made by the aggregation engines of set top boxes CPE1 and CPE2 later. In the worse case, even if the same decisions are made N times successively, then data turn in a loop N times between set top box CPE1 and set top box CPE2. This results in a latency increase and "overhead" to transmit the payload of IP data. This "overhead" can be significant due to the expansion of headers of TCP data packets (in the case of MPTCP), or due to successive encapsulations (in the case of GRE).

The provided embodiments prevent such a situation from occurring, or at least substantially limit the risk of it.

According to these implementations, the different network equipments (CPE) implement link aggregation by following the same aggregation rules. More particularly, their respective aggregation engines use the same aggregation rules. This is typically the case if both gateways CPE1 and CPE2 are the same product made available for its subscribers by a given Internet access provider (IAP).

When an equipment (CPE) has several other similar devices available to which it can connect, the CPE can choose a device (or several devices, if this is possible) in order to connect to it. It would be outside the scope of the present description to set forth criteria used to do so. However, those skilled in the art will appreciate that it is preferable to favour the device(s) which enable(s) the bandwidth to be maximised. The embodiments apply whatever the choice made by the aggregation engines.

FIGS. 3A-3D are schematic diagrams illustrating different configurations likely to cause the loop formation between two or more residential gateways, such as the residential gateway of FIG. 1.

Figure 3A:
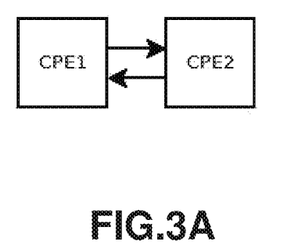
FIGS. 3A-3D are schematic diagrams illustrating different configurations likely to give rise to the formation of loops between two or more residential gateways, such as the residential gateway of FIG. 1.

The case of FIG. 3A corresponds to what has been described above with reference to FIGS. 2A-2C. It implements two set top boxes CPE1 and CPE2.

Figure 3B:
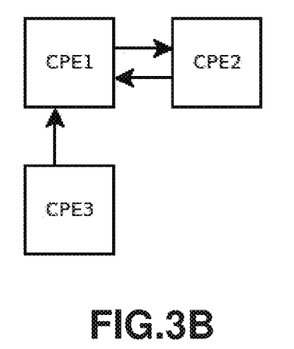
Figure 3C:
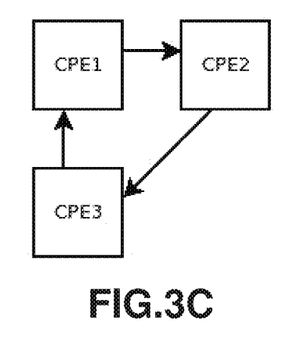

In the cases of FIG. 3B and FIG. 3C, a third set top box CPE3 is involved. A loop can then be formed between two set top boxes only, namely set top boxes CPE1 and CPE2 as represented in FIG. 3B. But a loop can also be formed which includes the three set top boxes CPE1, CPE2 and CPE3 as represented in FIG. 3C.

Figure 3D:
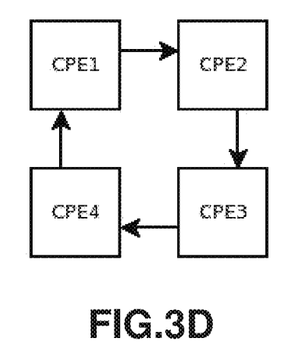

Finally, in the case of FIG. 3D, a loop is formed which includes four set top boxes CPE1, CPE2, CPE3 and CPE4. It goes without saying that other more complex loop back configurations can exist, depending on the decisions made by the respective aggregation engines of each of these four set top boxes. Also when more set top boxes are involved.

The invention, as long as it is implemented in each of the concerned set top boxes, addresses the technical problem associated with all the aforementioned configurations. For this, the role of "CPE1" and of "CPE2" is taken in turn by the different network equipments.

Furthermore, those skilled in the art will appreciate that, if in the examples set forth until now with reference to FIGS. 2A-2C and 3A-3D there are, for each set top box CPE1 and CPE2, two output links eligible for aggregation, this being a minimum. Indeed, there can be more output links eligible for aggregation, there is no limitation on that. There can be other links likely to create loops (several links such as link $L_1$) and/or links which are directly connected to Internet (such as links $L_2$) or to a device which does not perform link aggregation.

Figure 4:
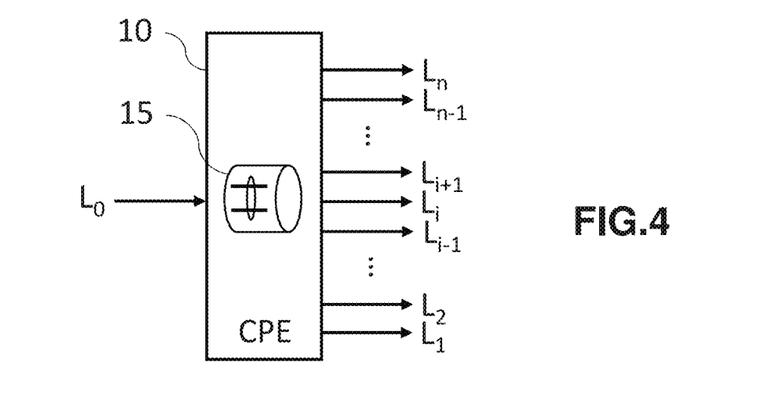
FIG. 4 is a simplified schematic diagram of another exemplary residential gateway with more than two links eligible for link aggregation; and, FIG. 5 is a diagram of steps which illustrates embodiments of the routing method.

FIG. 4 is thus a simplified schematic diagram of another exemplary residential gateway 10, with more than two output links eligible for link aggregation. In the example represented, there is for example a number n of output links $L_i$, where i is an index between 1 and n. These links $L_1$ to $L_n$ enable the set top box 10 to be connected to Internet, directly or indirectly via other set top boxes or other equipments. In the example represented, link $L_0$ is the input link through which the set top box 10 is connected to the subscriber's home network (LAN).

Figure 5:
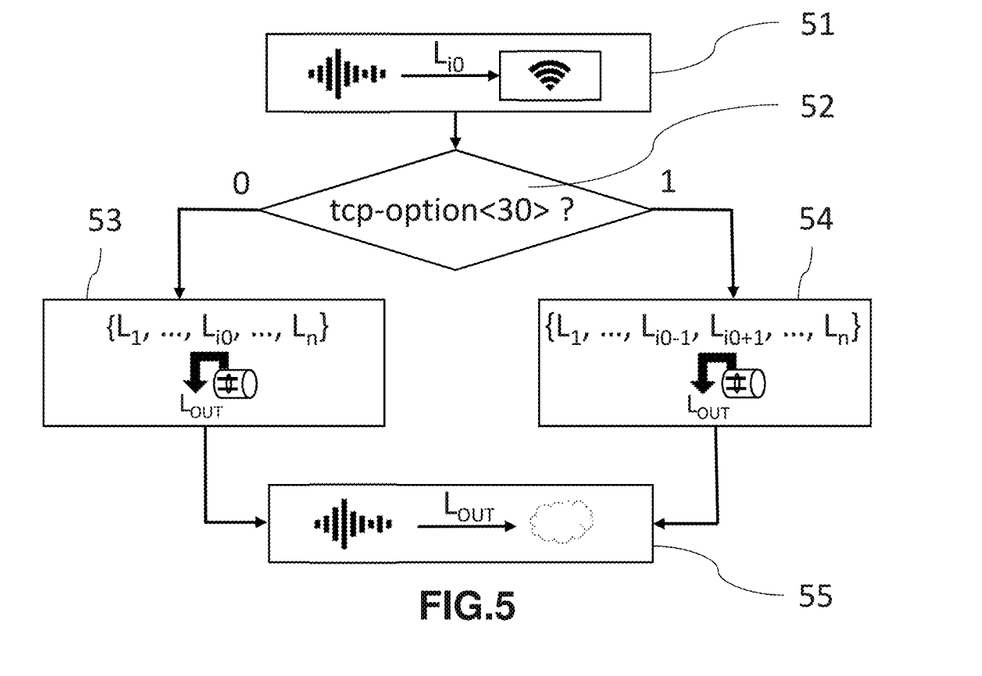

With reference to the diagram of steps of FIG. 5, the method for routing information according to embodiments comprises the following steps, which are implemented in the second network equipment CPE2 of FIGS. 2A-2C, and, for example, more particularly, in the aggregation engine 15 of this device.

In step 51, the set top box CPE2 receives data from the set top box CPE1. In exemplary applications, these data comprise UDP data packets. Nevertheless in other applications, they can comprise a connection, or a data flow. Data are received via an interface of a determined rank i0, in all the n interfaces corresponding to the n output links $L_i$ (with i being between 1 and n) of the generic set top box 10 represented in FIG. 4.

In step 52, it is detected whether or not data received in step 51 have already undergone a link aggregation operation in or upstream of set top box CPE1, based on markers present in data.

The term "upstream" herein refers to the data path from the source host which first emitted data, and which can have directly or indirectly transmitted them (i.e. via other network equipments) to the set top box CPE1 as part of one (or more) prior routing operation(s). Indeed, the set top box CPE1 is not necessarily the host at the origin of data transmission, and can only be a transmission node between the source host and the destination host in the network 20.

The term "markers" in turn refers to the information present in data which mark the fact, i.e. which indicate that data have undergone a link aggregation upstream of the set top box CPE2 in the transmission chain, either in set top box CPE1 from which data directly arrive, or upstream of the set top box CPE1. This generic notion of markers refers to various realities, according to the concerned implementation.

Especially, if the MPTCP protocol has been used for the link aggregation as in the example represented in FIG. 5, then the TCP option field 30, reserved for this purpose by the Internet Assigned Number Authority (IANA), is present in data received by the set top box CPE2. Step 52 then comprises testing the presence of this option field in the data received. If it is a GRE protocol which has been used, then the marker to be searched for in the received data corresponds to code 47 in the "protocol" field of the IP header of an IPv4 data packet, or in the "next header" field of the last header of an IPv6 data packet. Other examples will be given later.

In all the implementations, there are then two cases for selecting the output link $L_{OUT}$ by the aggregation engine 15 of the set top box CPE2, depending on the testing result of step 52.

If data have not already undergone link aggregation, then in step 53 the engine 15 selects the output link $L_{OUT}$ from all the output links of the set top box CPE2 involved in link aggregation in this device. In the example represented in FIG. 5 and for a set top box CPE2 in accordance with that of FIG. 4, they are all the links n of the output links $L_i$, where i takes all the index values between 1 and n. Stated differently, the output link $L_{OUT}$ is selected from all the output links $L_1$ to $L_n$ of the set top box CPE2 involved in aggregation, including the link $L_{i0}$ of the interface via which data were received by the set top box CPE2.

Otherwise, that is if data have already undergone link aggregation, then in step 54, the output link $L_{OUT}$ is selected from all the output links of set top box CPE2 involved in link aggregation in this network equipment except for the output link $L_{i0}$ to the set top box CPE1 from which data come. The loop formation risk is thus significantly decreased due to the link aggregation implemented in these two set top boxes CPE1 and CPE2. This is particularly efficient if only the link $L_{i0}$ to the set top box CPE1 is an open link, for example a radio link, as a link of a public Wi-Fi interface, whereas all the other output links $L_1, \ldots, L_{i0-1}, L_{i0+1}, \ldots, L_n$ are links directly enabling the aggregation point 21 in the network 20 to be directly reached. This is the case in the embodiments mainly contemplated here, such as described above with reference to the schematic diagrams of FIGS. 1 and 2A-2C. Indeed, in these examples, the link $L_{i0-1}$ of the set top box CPE2 to the set top box CPE1 is the Wi-Fi link noted $L_1$, and the output link which is selected in the case of a previous link aggregation detected in step 52 is the WAN link noted $L_2$ which enables the aggregation point 21 in the Internet 20 to be directly reached.

Data routing ends, in step 55, with transmitting data over the output link $L_{OUT}$ selected in step 53 or step 54, as applicable.

In most of the implementations, especially if the set top box CPE2 comprises more than one output link L1, ..., $L_{i0-1}, L_{i0+1}, \ldots, L_n$ other than the output link $L_{i0}$ to the set top box CPE1 (therefore with n being greater than or equal to 3), the aggregation engine 15 of the set top box CPE2 is used to select the output link of this network equipment.

However, when n is equal to 2, so that the set top box CPE2 only comprises a single output link $L_2$ other than the output link $L_1$ to the set top box CPE1 from which data received in step 51 come (i.e., the link $L_{i0}$ of the interface through which data have been received is the link $L_1$ in this example), then the step 65 of transmitting data comprises transmitting data directly over said single output link $L_2$ other than the output link $L_1$ to the set top box CPE1, without using the aggregation engine 15 of the set top box CPE2. Indeed, it is then known that to avoid loop formation, data can only be transmitted over this other single link $L_2$.

As already mentioned above, when the set top box CPE1 and set top box CPE2 use the MPTCP protocol for link aggregation, detecting 52 whether or not data have already undergone a link aggregation operation in or upstream of the set top box CPE1 comprises testing the presence of the "multipath TCP" TCP 30 option in data received by the set top box CPE2.

In the also already mentioned alternative, when the set top box CPE1 and the set top box CPE2 use GRE tunnels for link aggregation, detecting 52 whether or not data have already undergone a link aggregation operation in or upstream of the set top box CPE1 comprises testing the "protocol" field in a header of an IPv4 data packet (or, if need be, the "next header" field of the last header of an IPv6 packet) included in data received from the set top box CPE1. More specifically, it is tested if this field is equal to 47.

Alternatively or additionally to both above cases, the testing step 52 can comprise testing other markers in data which indicate that these data have undergone a link aggregation upstream of the set top box CPE2.

For example, detecting 52 whether or not data have already undergone a link aggregation operation in or upstream of the set top box CPE1 can further comprise checking the interface through which data entered the set top box CPE2. This makes it possible to remove limitations related to the fact that MPTCP or GRE, respectively, can have been used in or upstream of the set top box CPE1 in another context than the link aggregation.

In another example, detecting 52 whether or not data have already undergone a link aggregation operation in or upstream of the set top box CPE1 comprises comparing the destination IP address of a data packet included in data received from the set top box CPE1 with the IP addresses contained in a list of IP addresses of the aggregation point 21, provided of course that these addresses are known to the set top box CPE2.

In another example, detecting 52 whether or not data have already undergone a link aggregation operation in or upstream of the set top box CPE1 comprises further testing (that is additionally to testing the presence of "multipath TCP" TCP 30 for MPTCP, or testing whether the "protocol" field in the IP header of an IPv4 data packet or the "next header" field of the last header of an IPv6 packet comprised in data received from the set top box CPE1 is equal to 47 for GRE), an identifier, known to the set top box CPE2, the set top box CPE1 and/or another device upstream of this set top box CPE1 through which data passed before reaching the set top box CPE2.

The identifier of the set top box CPE1 can comprise a physical address in the network which is unique to said first network equipment, for example its MAC (for "Media Access Control") address, and is known to the set top box CPE2. It can be known either statically, or because it is communicated to the set top box CPE2 by a management protocol of the network such as TR-069 protocol or SNMP ("Simple Network Management Protocol") protocol, which is a communication protocol enabling the network managers to manage equipments of the network, to supervise and troubleshoot network and hardware problems remotely.

In one example, the test 52 can then be based on an interval of known MAC addresses, for example on the basis of the three first bytes of the MAC addresses which designate the manufacturer, that is the identifier of the OUI ("Organizationally Unique Identifier") organisation managed by IEEE to guarantee uniqueness of the MAC address numbers.

Those skilled in the art will appreciate that the aforementioned examples can be combined with each other, in order to give a more reliable detection of whether data have experienced a prior link aggregation.

One embodiment of the detecting step 62 which can be used in a link between the CPE1 and CPE2 devices which is a public Wi-Fi link will be now described.

Series 802.11 protocols operate at the layer 2 of the OSI model and provide wireless transmission of three types of frames:
 control frames which aid in delivering data frames;
 management frames which are used for establishing and maintaining Wi-Fi communications; and,
 data frames which ensure actual transport of payload.

Wi-Fi customers send management frames of the probe request sub-type to determine which access points or AP are reachable. And the APs answer the customers with information about their capabilities as network name (SSID), supported throughputs, names and manufacturer of the AP, etc.

This is why in an embodiment where data are received by the equipment CPE2 via the public Wi-Fi interface, it can be provided that the device CPE1 adds, when it uses link aggregation, a unique identifier into data. For example, this unique identifier can be a "vendor specific" tag in 802.11 probe requests, with a value known both to the device CPE1 and the device CPE2. When the device CPE2 receives a probe request from CPE1 with the "vendor specific" tag of an agreed value, it associates receiving data from the device CPE1 (for example based on its MAC address) to the fact that all the data coming from this device have already been aggregated.

A last embodiment applies to the case where the equipment CPE2 acts as a DHCP ("Dynamic Host Configuration Protocol") server towards the equipment CPE1 in the public Wi-Fi. It is reminded that DHCP, Dynamic Host Configuration Protocol, is a network protocol the role of which is to ensure automatic configuration of IP parameters of a station or machine, especially by automatically assigning it an IP address and a sub-network mask.

This is why, if the equipment CPE2 acts as a DHCP server with respect to the equipment CPE1 in the public Wi-Fi, then the equipment CPE1 can indicate via a DHCP option (for example the "vendor class identifier" option 60 with a predefined value known to CPE1 and CPE2) that it has already performed the aggregation. Thus, the device CPE2 can associate all the data coming from CPE1 to the fact that they have already been aggregated.

The present invention has been described and illustrated in the present detailed description and in the figures of the appended drawings, in possible embodiments. However, the present invention is not limited to the embodiments set forth. Other alternatives and embodiments can be deduced and implemented by those skilled in the art upon reading the present description and the appended drawings.

In the claims, the term "comprise" or "include" does not exclude other elements or other steps. A single processor or several other units can be used to implement the invention. The different characteristics set forth and/or claimed can advantageously be combined with each other. Their presence in the description or in different dependent claims does not exclude this possibility. Reference signs shall not be understood as limiting the scope of the invention.

The invention claimed is:

1. A method for routing data received from a first network equipment into a second network equipment of a data network, each one of said first and second network equipments comprising a link aggregation engine implementing a link aggregation technique that uses same aggregation rules to select one from at least a first and a second output links involved in link aggregation in said network equipment with the first and second output links being:
 an output link to the other one of said first and second network equipments; and
 at least one other output link which is capable of reaching a determined aggregation point in the data network,
the method comprising the following steps, implemented in the second network equipment, of:
i. receiving data coming from the first network equipment;
ii. detecting whether or not the data have already undergone a link aggregation operation in or upstream of the first network equipment, based on markers present in the data, the markers indicating that the link aggregation operation has been performed using Generic Routing Encapsulation (GRE) tunnels, the link aggregation operation aggregating, using said same aggregation rules, several network interfaces in said first network equipment or in a network device upstream of the first network equipment into a logical interface to increase bandwidth; and then, iii. avoiding loop by selecting an output link from all the output links of the second network equipment involved in link aggregation in said second network equipment if the data have not already undergone link aggregation, or selecting the output link from all the output links of the second network equipment involved in the link aggregation in said second network equipment except for the output link to the first network equipment if the data have already undergone link aggregation; and, iv. transmitting data over the selected output link.

2. The method according to claim 1, comprising using an aggregation engine of the second network equipment to select the output link of said second network equipment if the second network equipment comprises more than one output link other than the output link to the first network equipment.

3. The method according to claim 1, wherein, if the second network equipment comprises only a single output link other than the output link to the first network equipment, the step of transmitting data comprises transmitting data directly over said single output link other than the output link to the first network equipment, without using the aggregation engine of the second network equipment.

4. The method according to claim 1, wherein, the first network equipment and the second network equipment using Generic Routing Encapsulation (GRE) tunnels for link aggregation, detecting whether or not data have already undergone a link aggregation operation in or upstream of the first network equipment comprises testing whether the "protocol" field in the IP header of an IPv4 data packet, or the "next header" field in the last header of an IPv6 data packet, included in data received from the first network equipment, is equal to 47.

5. The method according to claim 1, wherein detecting whether or not data have already undergone a link aggregation operation in or upstream of the first network equipment comprises comparing the destination IP address of a data packet included in data received from the first network equipment with IP addresses contained in a list of respective IP addresses of a plurality of aggregation points of the data network.

6. The method according to claim 1, wherein detecting whether or not data have already undergone a link aggregation operation in or upstream of the first network equipment comprises further testing an identifier, known by the second network equipment, of the first network equipment and/or of another device upstream of said first network equipment through which data passed before reaching the second network equipment.

7. The method according to claim 6, wherein the identifier of the first network equipment comprises a physical address in the network which is unique to said first network equipment, and is known to the second network equipment either statically or because it is communicated to said second network equipment by a management protocol of the network, and wherein testing the identifier comprises comparing with an interval of physical addresses known to the second network equipment.

8. The method according to claim 1, wherein since data are received from the first network equipment via a Wi-Fi IEEE 802.11 interface of the second network equipment, detecting whether or not data have already undergone a link aggregation operation in or upstream of the first network equipment comprises further testing a specific value in attribute number 26 of a probe request type frame.

9. The method according to claim 1, wherein since the second network equipment acts as a DHCP server towards the first network equipment and data are received by said second network equipment via a public Wi-Fi network, detecting whether or not data have already undergone a link aggregation operation in the first network equipment comprises testing a DHCP option with a predefined value known to the first network equipment and the second network equipment, inserted by the first network equipment when the data are subjected to link aggregation in said first network equipment.

10. A device for routing data received from a first network equipment into a second network equipment, each one of said first and second network equipments comprising a link aggregation engine implementing a link aggregation technique that uses same aggregation rules to select one from at least a first and a second output links involved in the link aggregation in said network equipment with the first and second output links being:
 an output link to the other one of said first and second network equipment; and
 at least one other output link which is capable of reaching an aggregation point in the network,
the device comprising, in the second network equipment:

i. means for receiving data coming from the first network equipment;

ii. means for detecting whether or not the data have already undergone a link aggregation operation in or upstream of the first network equipment, based on markers present in the data, the markers indicating that the link aggregation operation has been performed using Generic Routing Encapsulation (GRE) tunnels, the link aggregation operation aggregating, using said same aggregation rules, several network interfaces in said first network equipment or in a network device upstream of the first network equipment into a logical interface to increase bandwidth; and then, iii. means for avoiding loop by selecting an output link from all the output links of the second network equipment involved in link aggregation in said second network equipment if the data have not already undergone link aggregation, or selecting the output link from all the output links of the second network equipment involved in link aggregation in said second network equipment except for the output link to the first network equipment if the data have already undergone link aggregation; and, iv. means for transmitting data over the selected output link.

11. A residential gateway comprising a device according to claim 10.

12. A computer program product directly loadable into an internal memory of a digital computer, comprising software code portions which, when said software code portions run by a computer, cause the computer to implement all the steps of the method according to claim 1.

13. A non-transitory data recording medium readable by a machine comprising a processor, comprising software code portions for performing the method according to claim 1.

* * * * *